Feb. 16, 1926.  1,573,380
F. G. EVANS
MOUNTING AND MEANS FOR TILTING VEHICLE HEADLIGHTS
Filed Sept. 17, 1924

Inventor
F. G. Evans.
by Langner, Perry, Card & Langner
Attys.

Patented Feb. 16, 1926.

1,573,380

UNITED STATES PATENT OFFICE.

FRANK GEORGE EVANS, OF NEW PLYMOUTH, NEW ZEALAND.

MOUNTING AND MEANS FOR TILTING VEHICLE HEADLIGHTS.

Application filed September 17, 1924. Serial No. 738,298.

*To all whom it may concern:*

Be it known that I, FRANK GEORGE EVANS, a citizen of the Dominion of New Zealand, residing at New Plymouth, in the Provincial District of Taranaki, in the Dominion of New Zealand, have invented certain new and useful Improvements in Mountings and Means for Tilting Vehicle Headlights, of which the following is a specification.

This invention relates to means for operating vehicle headlights of the type wherein the latter are capable of being moved through a vertical plane or planes in order that the light from said lamps may be thrown downwards on to the ground immediately in front of the vehicle on which the lamps are mounted, to avoid dazzling the drivers of approaching vehicles, and other traffic.

The invention has for its object the provision of improvements whereby said lamps may be operated and controlled in a better manner than heretofore, said improvements consisting in connecting to a lamp or to a member connecting a pair thereof a spring operated rod which is concealed and protected by the fore part of the vehicle, and passes through a keyhole shaped opening in the narrow portion of which any one of two or more reduced portions of the rod, can be entered to retain the lamp or lamps in a selected position, said lamp or lamps being preferably mounted on a bracket or brackets hinged at its or their lower end or ends to the vehicle.

The invention will be further described with the aid of the accompanying drawing, wherein:—

Figure 1:
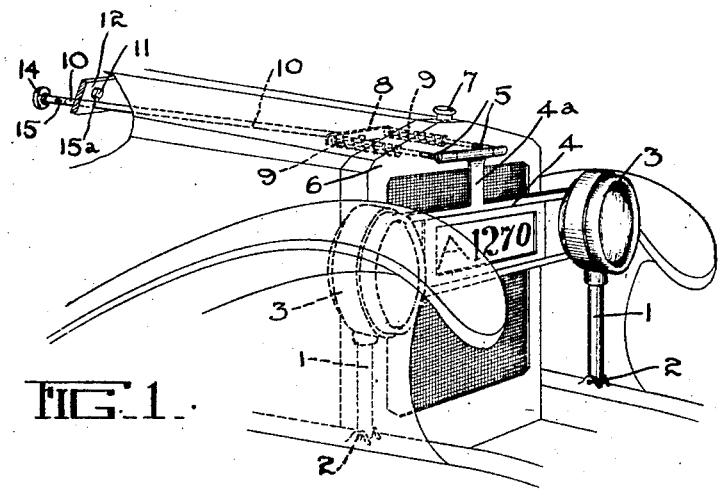
Figure 2:
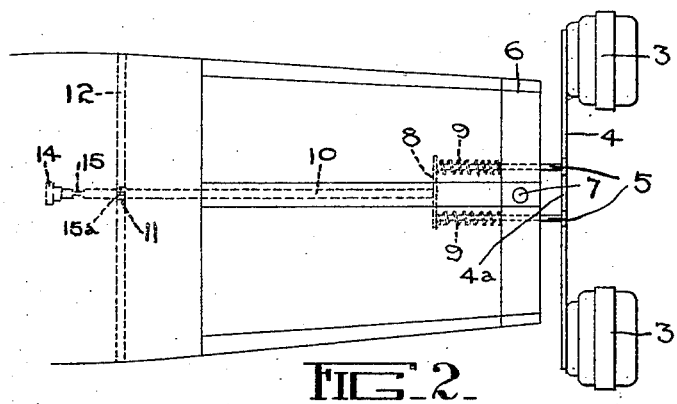
Figure 3:
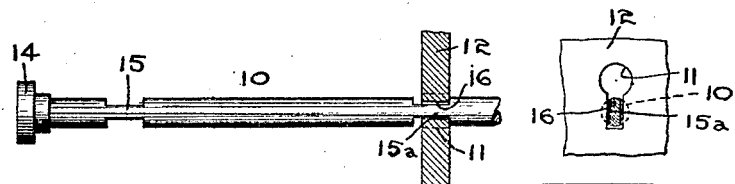
Figure 4:
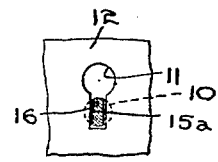

Figure 1 is a perspective view of the improved apparatus fitted to a motor vehicle, Figure 2 is a plan view thereof, while Figure 3 is an enlarged part sectional plan view, and Figure 4 an enlarged part sectional elevation of the means for locking the operating rod in a selected position.

Brackets 1 hinged at 2 to the vehicle chassis or other convenient parts of the vehicle, carry at their upper ends the usual lamps or headlights 3, the latter being rigidly secured together by means of cross rods or stays 4 in such a manner that both lamps 3 must move about their hinges 2 together and to an equal extent, said hinges 2 being formed so that the brackets 1 and headlights 3 carried thereby are capable of movement through a vertical plane or planes.

A projection 4ª from a connecting rod or stay 4 is hinged to the legs 5 of a fork slidable through the radiator 6 of the vehicle, said legs 5 being located preferably one at each side of the water inlet 7, the cross portion 8 of the fork connecting the legs thereof together at their rear ends being secured to an operating rod 10.

Springs 9 passed on the legs 5 are located between the rear of the radiator 6 and the cross portion 8 connecting said legs 5.

The operating rod 10 extends rearwardly through a hole 11 in the dashboard 12 and is provided at its rear end with suitable means whereby it may be gripped, as for instance with a handle 14.

Movement of the headlamps 3 in order to direct the light therefrom downwards onto the ground immediately ahead of the vehicle is caused by the driver of the latter pushing forward the rod 10 against the action of the springs 9, thereby causing the said headlights to be tilted or inclined forwards and downwards.

The lamps 3 are returned to their usual position on the operating rod 10 being released, by the expansion of the springs 9.

The operating rod 10 is reduced in thickness as at 15, near its rear end, while the hole 11 in the dash board 12 through which said operating rod is adapted to slide, opens downwardly into a slot 16, the width of which is less than the diameter of the operating rod 10.

On the operating rod 10 being pushed forward through the hole 11 to its extreme forward position, the reduced portion 15 thereof is brought over the slot 16 in the dash board 12. The rear end of the operating rod is then depressed to cause the said reduced portion 15 to pass into the slot 16 and so retain the rod 10 in its forward position against the action of the springs 9, until such time as the portion 15 is released from engagement in said slot, which is effected by raising the rear end of the operating rod 10 until the reduced portion 15 of the latter is raised from the slot 16 into the hole 11, when the springs 9 expand and return the said rod and the headlamps 3 to their usual positions.

A second reduced portion 15ª can be provided on the rod 10 for retaining the lamps 3 in their usual positions, and other similar reduced portions can be provided in order that the said lamps 3 may be set and retained in desired positions.

The bars or stays 4 connecting together the headlamps 3 can be utilized for carrying the registration or number plate of the vehicle, as shown in the drawing herewith.

What I do claim and desire to obtain by Letters Patent of the United States of America is:—

1. Means for the purpose described, comprising, at least two lamps pivoted for oscillation in vertical planes, tie means interconnecting the lamps, an upstanding bracket connected to the center of the tie means, a round operating rod, a fork carried at one end of the operating rod and pivoted to the bracket, and an operating handle at the other end of the rod, a support slidably receiving the fork, springs sleeved on the tines of the fork and biasing the rod in one direction, a key hole slotted member slidably receiving the rod, and a plurality of flattened portions on the rod for cooperating with the key hole slot to hold the rod in fixed position.

2. Means for the purpose described, comprising, at least two lamps, vertical standards carrying the lamps means pivoting the lower ends of the standards to permit oscillation of the lamps in vertical planes, tie rods rigidly interconnecting the lamps, an upstanding bracket fixed to the tie rods midway between the lamps, a round operating rod, a fork carried by the rod, and means pivoting the fork to the bracket, a support slidably receiving the fork, springs sleeved on the tines of the fork and biasing the rod in one direction, a key hole slotted member slidably receiving the rod, and a plurality of flattened portions on the rod for cooperating with the key hole slot to hold the rod in fixed position.

In testimony whereof I have signed my name this 25th day of July, 1924.

FRANK GEORGE EVANS.